Oct. 17, 1967  S. D. POOL ET AL  3,347,032
MOUNTED FRUIT PICKER
Filed Oct. 15, 1964  4 Sheets-Sheet 3

Inventors:
Stuart D. Pool
William H. Knapp
By: John J. Kowalik
Atty.

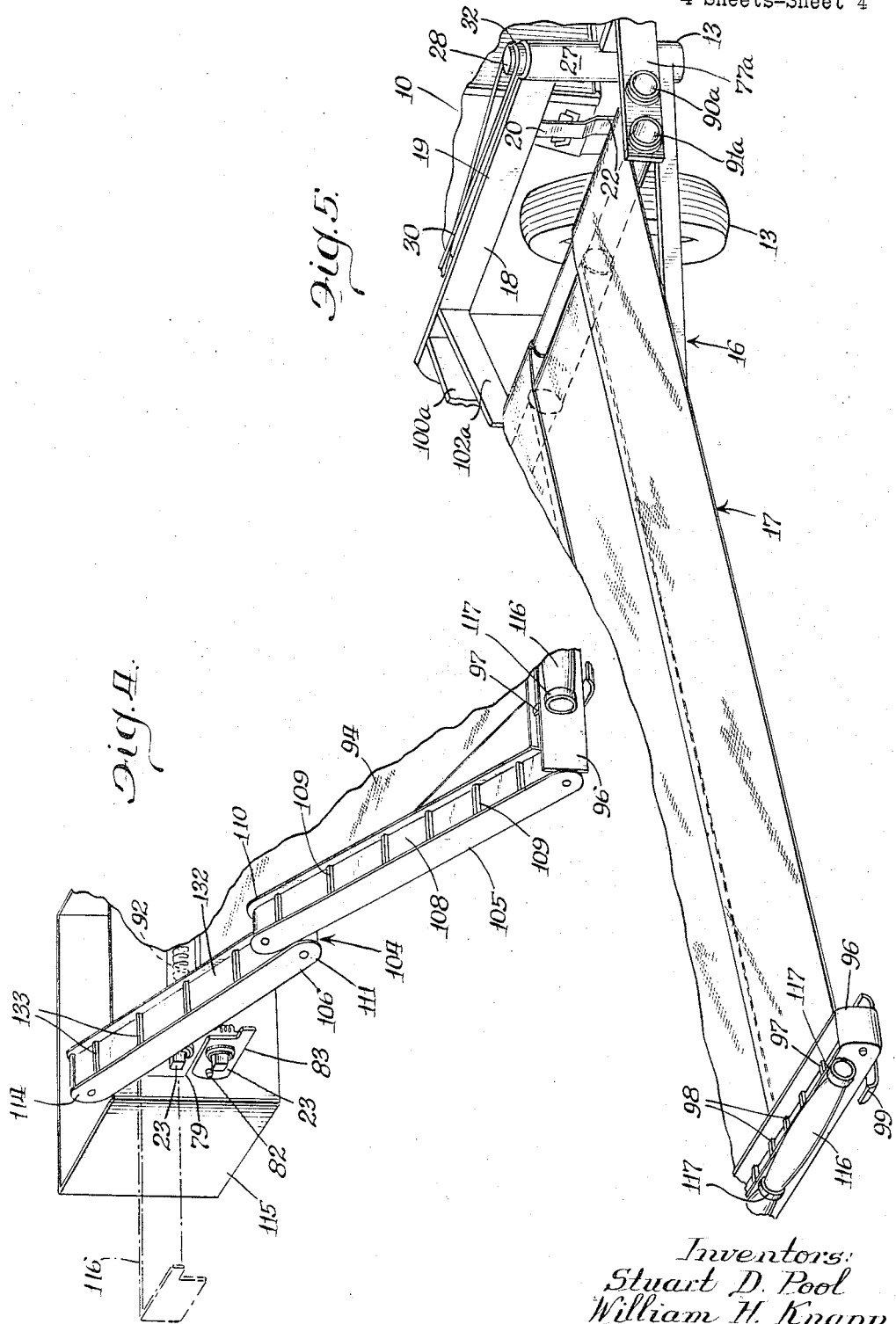

United States Patent Office 3,347,032
Patented Oct. 17, 1967

3,347,032
MOUNTED FRUIT PICKER
Stuart D. Pool and William H. Knapp, Naperville, Ill., assignors to International Harvester Company, a corporation of Delaware
Filed Oct. 15, 1964, Ser. No. 404,021
18 Claims. (Cl. 56—329)

ABSTRACT OF THE DISCLOSURE

A tractor mounted self winding harvester apron made up of strips of material, and a conveyor along its lower edge extending longitudinally of the tractor for collecting the fruit dropped from a tree onto the apron by a tractor mounted shaker.

---

This invention relates to a harvester adapted for harvesting of fruits and nuts and the like.

In the harvesting of tree and bush grown crops, a large catcher fabricated from a material such as canvas or the like is spread beneath a plant onto which its crop will be shaken. Means are provided for continuously conveying the crop from the catcher to a temporary storage place to make the catcher available for continued use.

A catcher conventionally may be provided with a flexible lip or apron adapted to seal the catcher to half of a circumference of a tree. By using catchers in pairs, therefore, loss of crop from trees is precluded provided the co-acting catchers extend over a sufficiently large area to preclude portions of the crop from falling beyond their peripheries.

To facilitate transportation within an orchard from tree to tree, for example, a catcher conventionally has a collapsible frame over which a catching web is mounted. Additionally, a conventional catcher is power driven to provide movement from location to location within a given orchard. For such purpose, a small tractor is preferable for moving a catcher from place to place, as it may be rather narrow and easy to maneuver between trees.

Various prior improvements in the fruit and nut harvesting art have been directed to the details of construction of collapsible frames which support fruit or nut catching webs. With the evolution of such improvements, better functioning frames have been developed. However, as functioning of the web supporting frames improved, frame complexity as well as frame costs have increased. Also, sizes of collapsed frames increased causing maneuverability within an orchard to be more difficult.

Other inadequacies in conventional devices relate to fixed sizes of the expanded or distended catchers. That is to say, prior catchers have fixed predetermined crop-catching areas which are not adapted to be enlarged.

Additionally, the catcher webs of prior conventional devices have not been adapted for ready repair or replacement of only portions of the webs. For example, in the event a portion of a prior web becomes worn, substantially the entire web is rendered useless because of the lack of adaptability thereof for replacement of a portion therein. Such feature is significant because frequently damage will occur to only a small portion of the fabric of a catching web. Because of lack of adaptability for repair of a portion, functioning of the entire device becomes impaired notwithstanding good condition of the non-damaged portion. Accordingly, the good fabric wastefully is rendered useless.

In accordance with the instant invention and as an object thereof, there is provided an improved harvester for harvesting fruits and nuts and the like.

It is a further object of the instant invention to provide a fruit and nut catcher and the like which can be readily used on existing tractor equipment.

It is additionally an object of the instant invention to provide a fruit and nut catcher and the like comprising an easily collapsible frame on which there is disposed a novel fruit catching web or apron.

It is yet a further object of the instant invention to adapt the fruit catching web or apron for easy replacement of sections or segments thereof.

A still further object of the instant invention is the provision of a collapsible and extensible frame to support the catching web or apron which comprises relatively few components, whereby the cost as well as the collapsed size of the catcher is minimized.

Furthermore, it is an object of the invention to provide means whereby the normally distended framework is adapted to be further enlarged to accommodate added crop catching web or apron sections, and also is adapted to be reduced in size by removal of crop catching sections, thereby, to accommodate requirements of varying physical conditions.

It is yet a further object of the instant invention to provide, in combination with the collapsible catcher, a collapsible conveyor which is operably connected to and carried along with the collapsible catcher, thereby obviating the requirement to provide separate or additional conveyors.

These and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:

FIG. 4 is a perspective view of a fragment taken from the right side of the catcher, with parts dotted for the purpose of illustration, the shaker being omitted.

FIG. 5 is a perspective view of a fragment taken from the left side of a modified form of the invention, with parts dotted for the purpose of illustration.

Figure 1:
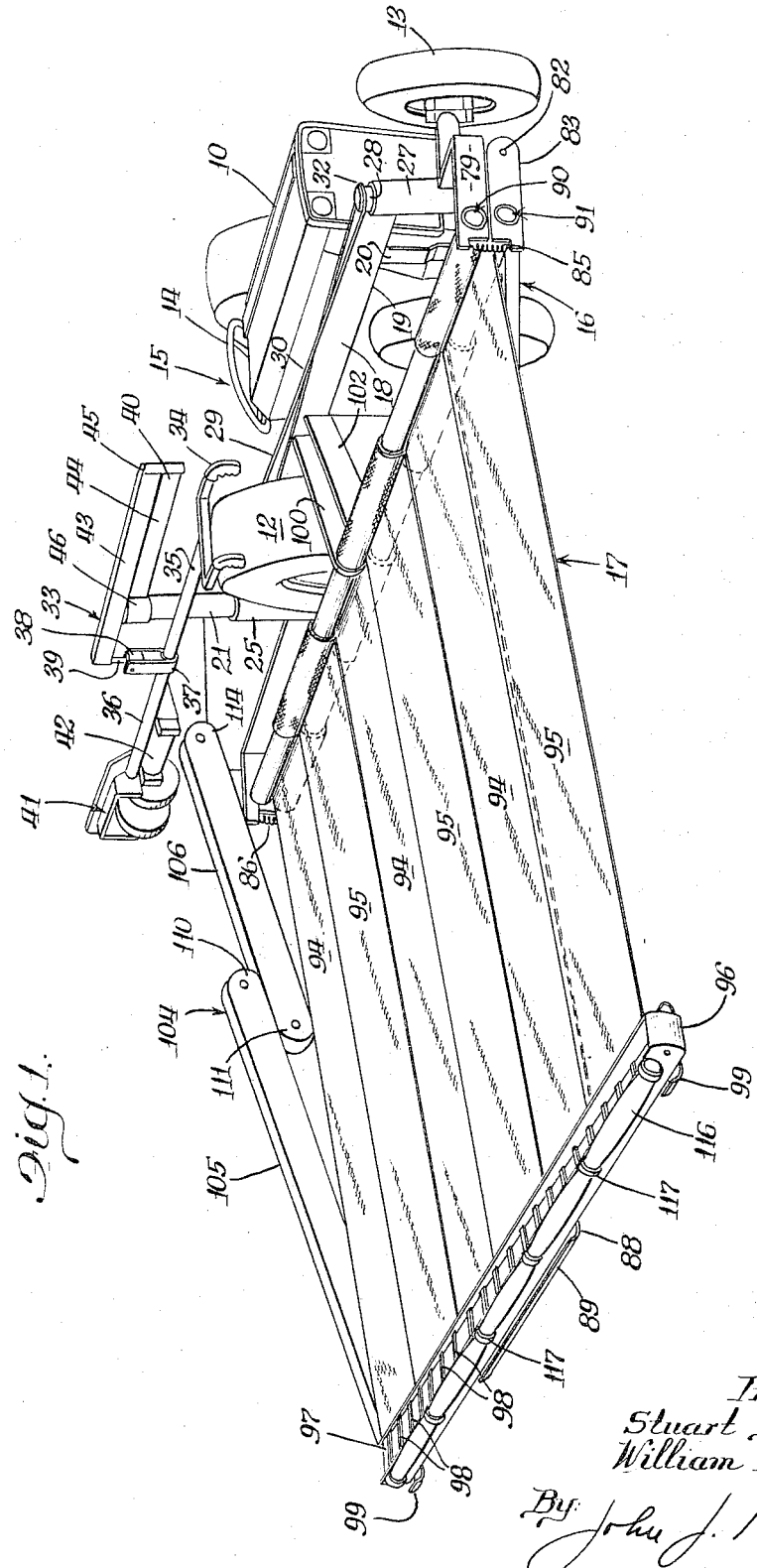
FIG. 1 is a perspective view from the left side of the catcher of one embodiment of the invention and showing the catcher extended, parts being dotted for the purpose of illustration.

Now, having reference more particularly to the drawings, therein there is disclosed a conventional tractor generally designated as 10. The frame of the tractor or prime mover 10 supports a rear axle 11 on the opposite end portions of which are mounted conventional traction or drive wheels 12 which are disposed at opposite sides of the tractor 10. The front end of the tractor 10 is suitably supported on a pair of opposed wheels 13. The tractor 10 has the customary provision 14 for steering by an operator accommodated on the tractor at 15.

While the details of construction of the tractor are not critical with respect to the instant invention, the nature of the invention permits employment of a standard conventional tractor of small size facilitating a high degree of maneuverability between closely spaced trees in an orchard. Furthermore, the tractor is used to transport the catcher device which is the subject of the invention and to be hereinafter described. Additionally, through proper linkage or connection to the tractor power plant, power operated portions of the invention will function.

The catcher mechanism with which the instant invention concerns itself may be considered to comprise essentially two components, namely, an expansible or extendible and contractable framework generally designated by the numeral 16, and an expansible or extensible and contractable crop catching apron or web generally designated by the numeral 17 and supported or carried by said framework 16.

The framework 16 comprises an elongated rod or bar 18 which extends longitudinally of the tractor and substantially parallel therto, and is disposed horizontally at a level which may be about half the height of the tractor 10.

One side portion 19 of the rod or bar 18 is rigidly secured by fasteners (not seen) to a brace 20. Brace 20 may be rigidly secured to a suitable portion of the tractor framework or housing, such as the front bolster 22, by suitable fasteners well known in the art.

Figure 3:
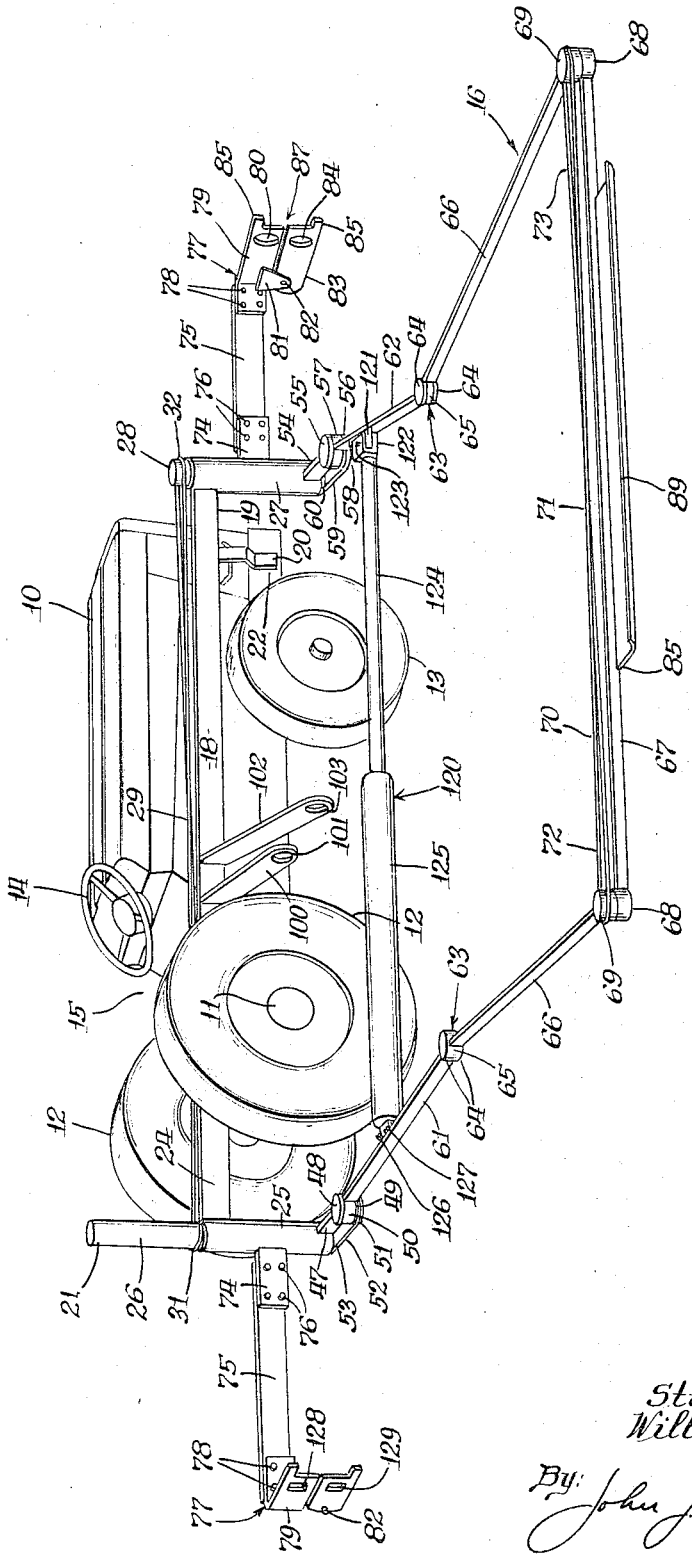
FIG. 3 is a perspective view from the right side of the catcher framework and showing the catcher framework is extended position, with the catcher apron and shaker omitted.

At the opposite side portion 24, as shown in FIG. 3, said rod or bar 18 may be connected to the rear axle carrier (not shown) of the tractor 10 by any conventional connecting means.

At this juncture, it is preferable that a definition of directional terms be set forth to facilitate understanding of the ensuing description primarily because the directions in terms of the tractor 10 will be different from directions in terms of the frame work 16 and the apron or web 17. The "front" of the tractor 10 is that part which is to the right in FIG. 3. Accordingly, the "back" or "rear" of the tractor is that part on which the wheels 12 are mounted. Therefore, the "right" side of the tractor is that side thereof which faces the viewer in FIG. 3; and the "left" side of the tractor 10 would be opposite to the right side. "Longitudinal" or "longitudinally" with respect to the tractor 10 refers to the direction which is parallel to the longitudinal axis of said tractor, namely, the axis of the tractor extending from the front to the back thereof.

On the other hand, the "rear" or "back" of framework 16 is that part which is formed by the inboard bar 18. With respect to the framework 16, therefore, the "left" side is that on which the bar or rod portion 19 is situated, whereas the "right" side of the framework 16 is that on which the side portion 24 of the bar 18 is situated. The "front" portion of the framework 16 is represented by that member which is lowermost in FIG. 3 and which is parallel to and opposite the bar or rod 18 heretofore defined.

It is appreciated that orientation with respect to the apron 17 and therewith connected mechanisms is the same as on the framework 16.

The right end portion 24 of the elongated bar 18 is rigidly secured to the upper end portion of a journalling tube and the like 25. The journalling tube 25 extends vertically downward from the end portion 24 toward the ground, but terminates above the ground level, however.

A rotatable vertical extending post 26 is journalled in and supported by the tube 25. The post 26 extends through the top and the bottom of the tube 25. The upper portion 21 of post 26 extends outwardly from the tube 25 a considerable distance to support a shaker mechanism, as will hereinafter be more fully described.

The upper end portion of a journalling tube 27 is rigidly secured to the left end portion 19 of the bar or rod 18. The tube 27 extends vertically downwardly from the bar or rod 18 toward the ground. However, like the tube 25, the tube 27 terminates above the ground.

The tubes 25 and 27 are of substantially equal length and are parallel to each other. As illustrated in the drawings, said tubes 25 and 27 are disposed at opposite sides of the bar or rod 18 from which said tubes 25 and 27 depend. Furthermore, they terminate an equal distance above ground.

A vertically extending post 28 is rotatably journalled in and supported by the tube 27. Said post 28 extends through the bottom and the top of said tube 27. However, while the post 28 is substantially shorter than the post 26 and terminates just a slight distance above the tube 27, it terminates below tube 27 at substantially the same level as post 26 terminates below tube 25.

An endless belt, ribbon or band 29 is crossed, as shown at 30, to form a pair of end loops 31 and 32 which are disposed about and operably engage the posts 26 and 28, respectively, to provide a pulley. Because the belt or band 29 is crossed, as the post 26 rotates counterclockwise, for example, the post 28 will accordingly rotate clockwise.

As illustrated in FIG. 3, the lower end portion of the tube 25 has rigidly secured thereto the inner end portion of a short arm or support 47. Arm 47 extends from said tube 25 forwardly toward the front of the framework 16. The longitudinal axis of the arm 47 preferably is at right angles to the longitudinal axis of the tractor 10. However, said arm 47 extends slightly downwardly as it extends toward the front of the framework 16.

At its forward end, the arm 47 has rigidly secured thereto a bearing member comprising an upper cap 48 and a lower apertured plate 49. A swivelable collar 50 is disposed between the plates 48 and 49.

Collar 50 has a depending sheave-like portion or boss 51 which extends through the aperture of plate 49. A pulley belt or band 52 is operably disposed about the sheave-like extension 51 and the lower end pulley portion 53 of the post 26 which extends below the tube 25.

As further illustrated in FIG. 3, at the opposite side of the device the inner end portion of a short arm or support member 54 is rigidly secured to the lower end portion of the tube 27. The short arm 54 is substantially parallel to the short arm 53, whereby it also slopes slightly downwardly as it extends forwardly from tube 27 toward the front of the framework 16.

At its forward end, the short arm 54 is rigidly secured to a bearing member comprising an upper bearing plate 55 and a lower apertured bearing plate 56. A swivelable collar or disc-like pivot 57 is journalled between the plates 55 and 56.

Collar 57 has a depending pulley or sheave-like portion 58 which extends through the aperture in the plate 56. A pulley band or belt 59 operably engages the pulley extension 58 and the lowermost pulley portion 60 of the rockable post 28 below tube 27.

Accordingly, the posts 26 and 28 rotate in the same directions as discs or collars 50 and 57, respectively.

The inner end portion of an elongated right arm 61 is rigidly secured to the pivot, collar or disc 50 and extends outwardly therefrom in a general forward direction with respect to the framework 16. The arm 61 is inclined slightly downwardly as it extends forwardly with respect to said framework 16, preferably at the same angle as the slope of arm 47.

The inner or rear end portion of an elongated left arm 62 is rigidly secured to the pivot, rotatable collar or disc 57. The elongated arm 62 is substantially the same length as the arm 61, and it slopes forward and downward at substantially the same rate as the arm 61.

At the outer or forward ends, each of arms 61 and 62 is operably connected to a pivot member 63. Each pivot member 63 is disclosed as comprising a pair of opposed outer or bearing plates 64 between which a disc or collar 65 is journalled.

The inner or rear end portions of a pair of elongated normally forwardly extending opposed side arms 66 are pivotably connected to the pivots 63 in a manner illustrated in the drawings. The arms 66 slope downward as they extend forward with respect to the framework 16, with the downward slope being at the same incline as the arms 61 and 62.

At the forward end of said arms 66, there is disposed a transversely extending elongated front or outboard frame member 67. The frame member 67 extends horizontally, and said front frame member may be substantially the same length as the bar or rod 18. Furthermore, the longitudinal axis of the front frame member 67 is parallel to the longitudinal axis of the bar or rod 18.

The front frame member 67 at its opposite ends is pivotably connected to the front ends of the side arms 66 by means of front pivoting members to be described. Each of said pivoting members comprises a lower journalling block 68 which is rigidly secured to an opposite end of the front frame member 67. An upper rotatable disc or pulley extension 69 is rigidly connected to the front end of each of side frame arms 66 and rides on top of a respective block 68, as illustrated in FIG. 3.

Accordingly, therefore, as the inner or rear ends of arms 66 are moved toward each other, pulley extensions 69 carried on the outer ends of said arms 66 will rotate on the pivot blocks 68 and pull the front frame member 67 rearwardly toward the tractor 10. During rearward movement, the longitudinal axis of said front frame member 67 remains parallel to the longitudinal axis of said tractor. An opposite phenomenon will occur as the pivots 63 are moved outwardly or away from each other. In such event, the front or outboard frame member 67 will then move forwardly away from tractor 10 while its longitudinal axis remains parallel to the longitudinal axis of said tractor 10.

A pulley belt or band 70 which is crossed, as designated at 71, to provide loops 72 and 73 at its opposite end portions is disposed in operable relationship about the opposed rotatable pulley extensions 69, whereby a torque created in one of the pulley extensions 69 will be translated into a torque of an opposite direction in the opposed of the pulley extensions 69. Thereby, uniform movement of the front frame member 67 as it is expanded and folded or collapsed is augmented, as well as are the forces tending to keep the path of movement of front frame member 67 perpendicular to the longitudinal axis of tractor 10.

To actuate the framework 16 to expand or extend or collapse, a double action hydraulic mechanism 120 may be provided. To mount said hydraulic mechanism, a small inwardly extending boss 121 is secured to the inner medial surface of the arm 62. A U-shaped bracket 122 between the ears of which the boss 121 is disposed is connected to said boss by means of a pin 123 which extends through the ears of the bracket 122 and the boss 121.

The left end of an elongated hydraulic piston member 124 is rigidly secured to the bracket 122 and extends centrally therefrom. An hydraulic cylinder 125 which is disposed coaxially to piston 124 is connected by a suitable link 126 and fasteners 127 to an inner medial portion of the elongated frame arm 61 in a position substantially corresponding to the position at which the bracket 122 is connected to the arm 62.

Now, as piston 124 extends, pivots 63, as well as rear portions of arms 66 and forward portions of arms 61 and 62, will move outwardly to elongate framework 16 and move front frame member 67 forwardly. When piston 124 is caused to withdraw into cylinder 125, an opposite framework action will occur.

The motion of arms 61 and 62 is translated into a corresponding torque in posts 26 and 28 which rotate opposite to each other. Such rotation as well as corresponding frame movement is augmented by pulley band or belt 29.

An ear or boss 74 which is rigidly secured to each of the vertical tubes 25 and 27 extends outwardly from each thereof in an opposite direction longitudinally of the longitudinal axis of the tractor. Thereby, each of the ears 74 extends from one side of the framework 16. The inner end portion of a rigid tie 75 is rigidly secured by fasteners such as bolts and the like 76 to each ear 74, as illustrated in FIG. 3 of the drawings. The ties 75 extend horizontally and are parallel to the longitudinal axis of the tractor 10. Each is disposed at substantially the same level above the ground as the other.

A right angular bracket 77 is rigidly secured by fasteners such as bolts and the like 78 to the outer end of each tie 75. Each of said right angle brackets 77 has a leg 79 which extends forwardly with respect to the framework 16.

Left leg 79 has a circular end aperture 80. Right leg 79 has a squared aperture 128. Apertures 80 and 128 are disposed in horizontal alignment.

The upper end portion of an ear or boss 81 depends from each of the legs 79. The lower end portion of each of said ears or bosses 81 is secured by a suitable fastener 82 to the rear end portion of a bracket 83 which is shaped much like the leg 79 with which such bracket is associated.

In its outer end portion, left bracket 83 is provided with a round port or aperture 84. Right bracket 84 has a square aperture 129. Apertures 84 and 129 are disposed in horizontal alignment with each other. Additionally, apertures 80 and 84 and apertures 128 and 129 are in vertical alignment with each other.

The front and upper end portion and the lower and forward end portion of leg 79 and bracket 83, respectively, of each connected together pair thereof provide a pair of forwardly extending extensions 85 which are in vertical alignment with each other. Each associated pair of ears 85 provides the facility for anchoring the opposite ends of an expansion spring 86 which is disposed in a recess 87 formed between each associated pair of ears, as illustrated in FIG. 3. Each spring 86 tends to hold the front end portions of its associated leg 79 and its associated bracket 83 together.

An elongated tray or shoe 88 with its longitudinal axis disposed longitudinally of the longitudinal axis of the front frame member 67 has its inner end rigidly secured by any suitable means to a medial portion of front frame member 67 along its lower edge. The elongated tray or shoe 88 has an upwardly turned lip or edge 89, as illustrated in the drawings.

The inner or rear end portion of an arm or bracket 100 which extends perpendicularly to the rod or bar 18 is rigidly secured thereto and extends outwardly and downwardly from a medial portion thereof. The forward or outer end portion of the arm or bracket 100 has an aperture 101 which is in horizontal alignment with apertures 80 and 128. Another arm 102 has its inner or rear end portion rigidly secured to a medial portion of the rod or bar 18. The arm 102 extends forwardly and downwardly perpendicularly away from said bar or rod 18. An aperture 103 in the forward or outer end portion of said arm 102 is in horizontal alignment with apertures 84 and 129.

The catcher apron 17 comprises an upper roller generally designated by the numeral 90 and a lower roller generally designated by the numeral 91. Roller 90 is mounted in apertures 80, 101 and 128. Roller 91 is mounted in apertures 84, 103 and 129.

As illustrated in FIG. 4, each roller comprises an elongated rod 23 which provides a fixed axis of rotation for its respective roller by retention of its angular right end in the square openings or apertures 128 and 129. Said rollers also comprise reels 130 and 131, respectively rotatable on rods 23 of each roller 90 and 91. A spring 92, seen in dotted lines in FIG. 4, acts to bias each of the reels 130 and 131 by having its opposite ends secured to each of the rods 23 and an associated end of the reels 130 and 131 in substantially the same manner as a window shade roller. That is to say, reels 130 and 131 rotate about a fixed axis provided by a respective rod 23 which is restrained from rotation by the configuration of the slot in which the angular end of said rod fits. Within each reel, one end of its respective spring 92 is connected to such reel and the other end thereof is connected to its rod 23. Thereby, upon rotation of the rollers 90 and 91 in one direction to tension their springs 92, energy will be built up therein, which will cause the rollers 90 and 91 to recoil upon release of the holding force.

A plurality of elongated fruit catching sections, webs or strips 94 and 95 extend longitudinally of the framework 16 and comprise the catching apron. The web or strips 94 and 95 are preferably fabricated from belt, canvas or the like. The sections or strips 94 and 95 are alternated in the manner shown in FIG. 1 with the inner or rear end portions of the strips or sections 94 fastened on the roller 91 and with the inner end portions of the strips or catching sections 95 fastened on the roller 90. The webs or strips 94 and 95 are alternated or interdigitated so that going from side to side of the framework 16 one encounters first a strip or section 94 followed by a strip or section 95 followed by a strip or section 94 and so on. Accordingly, by reason of the disposition of the rollers, the strips or sections 94 will be disposed at a slightly lower level than the strips or sections 95. Preferably, like numbered strips are spaced apart a distance which is slightly smaller than the width of the other sections, whereby the strips or sections 95 will overlie the strips or sections 94.

To preclude undesirable vertical spacing between the respective strips or sections 94 and 95, the lower roller 91 has thes trips or sections 94 wound thereon with an overshot winding whereas the upper roller 90 has its strips or sections 95 wound thereon with an undershot winding. Additionally, spring 86 serves to hold said rollers together.

By reason of the foregoing construction, with the catcher apron in strips, it is apparent that damaged sections or strips can readily be replaced with little effort and without disturbance to or loss of the remainder of the strips or sections.

At their forward ends, the sections or strips 94 and 95 are fastened or secured to a channel or trough-like conveyor housing 96 which extends transversely or from side to side of the catcher. An endless conveyor 97 which operably may be connected to the tractor power plant in any suitable fashion and having flights 98 is disposed within the housing 96. From left to right, the conveyor has a slightly upward inclination, as illustrated in FIG. 1.

The housing 96 is adapted to be mounted adjacent the ground, and, to support the housing 96 on the ground, a plurality of transversely extending horizontally spaced apart shoes 99, which are suitably secured in any conventional manner to the housing 96, are employed. The housing 96 is adapted to be secured to the forward frame member 67, and in normal use is disposed within the elongated tray or front rest 88, as illustrated in FIGS. 1 and 2.

Now then, as the framework 16 is extended, the housing 96 will be carried forward and the strips or sections 94 and 95 will be elongated. On the other hand, when the framework 16 is folded or collapsed, the sections 94 and 95 will be rolled upon their respective reels under the action of springs 92.

Figure 2:
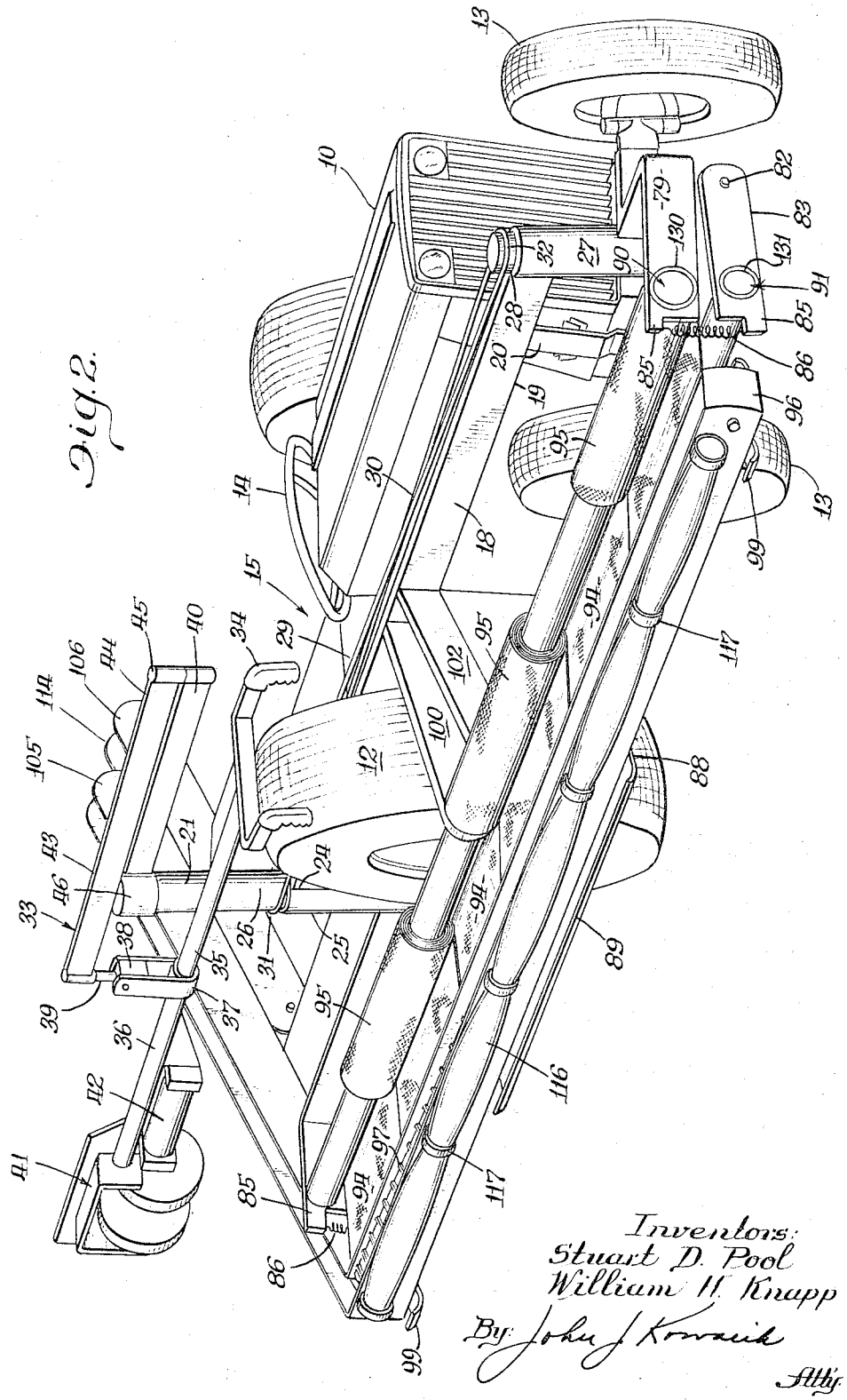
FIG. 2 is a perspective view from the left side of the catcher of the embodiment showing the catcher folded or collapsed.

As illustrated in FIGS. 1, 2 and 4, an elevator generally designated by the numeral 104 is disposed along the right side of the extandable apron 17. The elevator comprises a pair of sections 105 and 106, section 105 being the forward section and section 106 being the rearward part. The housing of the forward elevator section 105 may be an integral extension of the housing 96.

An endless conveyor 108 having flights 109 is mounted in section 105. An endless conveyor 132 having flights 133 is mounted in elevator section 106. Conveyors 108 and 132 may be connected operably to the tractor power source (not shown) by means well known in the art.

The rear end housing portion 110 of the conveyor section 105 is slidably mounted on and disposed above the forward end housing portion 111 of the rearward section 106. Now, both of the elevator sections 105 and 106 slope upwardly as they extend rearwardly of the catcher 17 or framework 16 in an inclined path the angle of which is greater than that of the slope of the strips or sections 94 and 95. The forward elevator section 105 rides on the rearward conveyor section 106 so that when the housing is collapsed the forward section 105 will slide along the rearward elevator section 106 to the position illustrated in FIG. 2.

The rear end portion 114 of the elevator 104 is disposed above an enlarged container or receptacle 115 into which the elevated crop is dropped, as illustrated in FIG. 4. The container 115 is suitably supported by the framework of the tractor 10 in any suitable or conventional fashion.

An elongated resilient bumper, cushion or pad 116 is disposed along the forward end of the housing 96. The pad or cushion or bumper 116 is secured to the housing by arcuately shaped fasteners or straps 117, only some of which are numbered in the drawings. Said fasteners 117 are spaced horizontally from each other. Bumper 116 acts to seal suitably a tree between the instant device and a like device.

In FIG. 5, a modified form of the invention is disclosed. Therein spring biased rollers 90a and 91a are supported in substantially horizontal relationship in brackets 77a connected to tubes 25 and 27 and in arms 100a and 102a, respectively, which are connected to the elongated rod or bar 18. In the modified form, therefore, the reel sections are placed one behind the other rather than one above the other. In the modified form, therefore, all of the reels may be wound with an overshot winding.

The overshot winding provides an advantage in ridding the apron of trash because it will be thrown from the apron when it is retracted. On the other hand, in the first described form, in order to keep the adjacent apron segments or strips 94 and 95 at substantially the same level, the windings on adjacent reels are alternated between overshot and undershot. Accordingly, when using that form of the invention, some trash will be rolled up in the rollers, the reels of which are wound undershot unless a shield (not shown) is employed.

From the foregoing, it is apparent that the framework 16 can be widened and apron strips added by elongating the ties 75, as illustrated in dotted lines at 119 in FIG. 4.

Having thus described the details of construction, a brief description of the operation of the device now ensues.

With the catching apron 17 and the framework 16 in the position illustrated in FIG. 2, that is, folded toward the right side of the tractor 10, the tractor may be maneuvered through a grove of closely spaced trees adjacent a tree to be harvested. An operator will then actuate hydraulic mechanism 120 to extend piston 124.

Thereupon, pivot members 63 will be caused to move away from each other and outwardly. As the pivot members 63 move outwardly, arms 61 and 62 and the arms 66 straighten to elongate framework 16 and carry front frame member 67 in a path perpendicular to the longitudinal axis of the tractor 10.

A balanced and uniform motion of front member 67 parallel to the longitudinal axis of tractor 10 is insured because the piston extending torque is transmitted to posts 26 and 28 through pulley belts 52 and 59. The torque is further balanced by pulley bands 29 and 70.

Housing 96 which is secured to the front frame member 67 accordingly moves outwardly from the right side of the tractor 10 along with the front frame member 67, and stretches or unwinds the apron comprised of the strips 94 and 95 against the action of their respective springs 92.

A tree shaker may be incorporated in the harvesting device. The specific details of the construction of the tree shaker are not critical to the invention, and any suitable or conventionally available tree shaker may be employed. In FIGS. 1 and 2 of the drawings, a conventional tree shaker is shown. It is designated generally by numeral 33.

The shaker comprises a U-shaped hand or tree engaging member 34 adapted partially to gird or encircle a tree and the like. The hand or U-shaped member 34 is carried at the end of an extendable or reciprocable rod or arm 35 which telescopes into a tube-shaped slide 36. The end of the tube or tube-shaped slide 36 into which the rod 35 telescopes is supported by a bracket or sling 37 between the ears of which there is rigidly secured a block or plug 38.

The block or plug 38 is connected by a rigid link 39 to the outer end portion of an elongated extendable jointed arm 40, as illustrated in FIGS. 1 and 2.

A hydraulically actuated mechanism, generally designated by the numeral 41 and including a hydraulic cylinder 42 which is operably connected to a hydraulic motor in the conventional fashion by means (not shown), is adapted upon operation to cause the arm 35 to extend from or withdraw into the tube or tube-like slide 36. By rapidly reciprocating the arm 35 to rap quickly a tree with the hand or U-shaped member 34, fruit or nuts or the like will be dislodged and fall.

The foldable arm 40 is adapted to be disposed in tree shaking position, that is, at right angles to a tree to be harvested and the longitudinal axis of tractor 10. To such end, sections 43 and 44 of arm 40 are superposed with the section 43 preferably above and longer than the section 44. The arm sections 43 and 44 are connected together by a pivot 45 mounted in their adjacent ends.

At the inner end of the arm 40, that is, the inner end of the arm section 44, a collar or cap 46 is rigidly secured. Said cap is mounted on the upper end portion 21 of the post 26. Thereby, an operator of the tractor can cause the arm 40 to unfold to extend the arm 35 to tree shaking position with the hand or U-shaped member 34 adjacent a tree to be jolted.

It is appreciated that as the catcher mechanism or apron 17 is extended, it will move away from the right side of the tractor 10 in a downwardly sloping path until the shoes 99 engage the ground. The tractor is positioned in such a fashion that the shoes 99 will engage the ground to limit further extension when the bumper, cushion or sealing pad 116 engages the tree to be harvested. Co-acting with another harvester of similar construction, a seal may be formed by the cushions or pads 116 about the tree and provide a pair of aprons continuous around the periphery of a tree to the end that crop dropping from the tree will not fall to the ground but would have to fall upon an apron 17.

Because of the downward inclination of the extended catcher apron 17, caught crop will roll toward the conveyor housing 96 and be carried therefrom by conveyor 97 to the elevator 104. Thence, the crop will be transported to the container 115 into which the fruit and the like is dropped from the end of conveyor 104.

Once the tree has been harvested, the hydraulic mechanism will be actuated to retract piston 124. Thereupon, the pivot members 63 will be drawn toward each other, to carry the rear ends of the arms 66 as well as the forward ends of arms 61 and 62 toward each other to shrink framework 16, and to draw the transverse front frame member 67 rearwardly toward the tractor 10. As the extension force is released from the springs 92, the apron 17, that is, the sections 94 and 95, will be wound on their respective reels until the position of the framework 16 and the catcher 17 is once again that which is seen in FIG. 2.

As many substitutions or changes could be made in the above described construction, and as many apparently widely different embodiments of the invention within the scope of the claims could be constructed without departing from the spirit and scope thereof, it is intended that all matter contained in the accompanying specification shall be interpreted as being illustrative and not in a limiting sense.

It will be understood that the opening in lug 121 is larger than the diameter of pin 123 and similarly the opening in bracket 126 is larger than the pin on 127 passing therethrough so that the ram 120 is universally connected to arms 61, 62.

What is claimed is:

1. In combination with a tractor, a catcher for harvesting fruit and nuts comprising
    means providing back and front frame members disposed in parallel relationship to each other;
    means mounting the back frame member at one side of said tractor;
    means providing driven foldable arms for moving said front frame member toward and away from said back frame member, and
    self recoiling means including a fruit catching apron for extension with said frame for positioning the apron beneath a tree and for retraction for holding the apron with attendant positioning of the front frame member alongside the tractor for transport;

2. The device defined in claim 1 in which said frame members move apart and together in a path perpendicular to said members.

3. The device defined in claim 1 in which said driven foldable arms arranged in front and back pairs with a front and back arm of each pair pivotally connected together and to said front and back frame members, respectively.

4. The device defined in claim 3 further characterized by a transversely extending hydraulic mechanism operably connected to one pair of said arms whereupon actuation of said hydraulic mechanism said last mentioned pair of arms will pivot toward and away from each other to lengthen and shorten said catcher.

5. In combination with a tractor, a fruit catcher for harvesting fruits and nuts comprising
    a driven expandable and contractable frame including inboard and outboard elements, defining inboard and outboard edges of said catcher, said inboard element mounted on the tractor generally parallel thereto along one side thereof, and
    self winding crop catching apron rolls mounted on one of said elements and aprons wound on each roll and connected to the other of said elements whereby the aprons will wind themselves on their respective roll as said frame is contracted, said aprons being disposed in contiguous relation.

6. The device defined in claim 5 and a conveyor having a a portion mounted on the outboard element and extending along said outboard edge of the catcher for collecting fruit from the catcher.

7. In combination with a mobile prime mover, a catcher for harvesting fruit and nuts comprising
    a rear frame member mounted upon said prime mover alongside thereof;
    a front frame member disposed parallel to and below said rear frame member;
    two elongated side members disposed on each side of said and rear frame members
        and pivotally connected to each other and to said front and rear frame members;
    a self winding apron roll means mounted in said rear frame member
        and including an apron member;
    means for anchoring the front end portion of the apron member to said front frame member, and
    power driven means for moving said side members away from and toward each other
    whereby said front frame member is moved away from and toward said rear frame member to spread and permit self winding of the apron.

8. The device defined in claim 7 in which the apron comprises a plurality of overlapped elongated laterally disposed fabric strips.

9. A mobile catcher for harvesting fruit and nuts comprising a front frame member disposed parallel to and below said rear frame member;

two elongated side members disposed on each side of said front and rear frame members and pivotally connected to each other and to said front and rear frame members;

a self-winding apron roll means mounted in said rear frame member and including an apron member;

means for anchoring the front end portion of the apron to said front frame member;

power driven means for moving said side members away from and toward each other whereby said front frame member is moved away from and toward said rear frame member to spread and permit self-winding of the apron;

said apron roll means comprises
 a pair of spaced apart reel supporting rollers, and elongated apron strips alternately connected to said rollers.

10. A mobile catcher for harvesting fruit and nuts comprising
 a rear frame member;
 a front frame member disposed parallel to and below said rear frame member;
 two elongated side members disposed on each side of said front and rear frame members and pivotally connected to each other and to said front and rear frame members;
 a self-winding apron roll means mounted in said rear frame member and including an apron member;
 means for anchoring the front end portion of the apron to said front frame member;
 power driven means for moving said side members away from and toward each other whereby said front frame member is moved away from and toward said rear frame member to spread and permit self-winding of the apron;
 said apron roll means comprises a pair of spaced apart reel supporting rollers and elongated apron strips alternately connected to said rollers; and
 said reel supporting rollers are disposed substantially vertically to each other.

11. The device defined in claim 9 in which said reel supporting rollers are disposed substantially horizontally to each other.

12. The device defined in claim 2 further characterized by means for balancing the torque applied on said frame members whereby said frame members are held substantially parallel to each other as they move apart and together.

13. The device defined in claim 12 in which the means for balancing torque comprises pulley members.

14. The device defined in claim 13 in which the pulley members comprise
 rotatable parts connecting said rear frame member and front frame member to said foldable arms, and
 pulley bands operably connecting said rotatable parts.

15. A mobile catcher frame for fruit and nut catchers and the like comprising
 a driven elongated body;
 a catcher apron carrying frame means including an elongated bar secured to said body longitudinally thereof;
 journaled posts supported on opposite end portions of said bar;
 a pulley belt operably engaging said posts;
 a pair of opposed pivot members,
  pulley bands operably connecting each pivot member to a post;
 a foldable side arm comprising a pair of pivotally connected together sections and connected at an inner end portion to each pivot member;
 a transversely extending front frame member disposed between the outer end portions of said connected together sections and parallel to said bar;
 a pivot connected to each end portion of said front frame member and the adjacent outer end portion of a connected together section;
 a pulley ribbon operably connected to said pivots, and driven means for extending and pulling together the connected together portions of said connected together sections
whereby as the front frame member moves its path will be in a direction perpendicular to the longitudinal axis of said body inwardly and outwardly therefrom.

16. For harvesting crops from a tree, a prime mover having front and rear supports including vertical front and rear spindles, apron-supporting frame means having first front and rear arm members pivoted respectively with said front and rear spindles at one of their ends and extending laterally from a side of said prime mover, ram means operatively connected between said arm members, second front and rear arm members pivoted at one of their corresponding ends to the other corresponding ends of said first arm members, an end member extending between the other corresponding ends of said second arm members, means pivotally mounting said second arm members at said other corresponding ends to the respective ends of said end member, and equalizing means interconnecting the last-mentioned means for controlling and equalizing the movements of said front arm means with corresponding movements of the rear arm means attendant to operation of said ram means.

17. The invention according to claim 16, and fruit catching apron means mounted on said frame means, and a tree shaking mechanism carried from at least one of said supports, said supports adapted to transmit reaction vibratory forces to said apron for gravitating crops on the apron to its discharge area.

18. The invention according to claim 16 and said prime mover comprising a heavy driving axle structure adjacent to said rear support, and a tree shaking mechanism mounted on said rear support, and mounting frame means extending between and connected to said supports, and means securing said frame means to a side of the tractor.

References Cited

UNITED STATES PATENTS

| | | | |
|---|---|---|---|
| 1,915,944 | 6/1933 | Nagel | 160—240 X |
| 1,981,444 | 11/1934 | Wittel | 160—240 X |
| 2,692,470 | 10/1954 | Boman | 56—328 |
| 2,913,866 | 11/1959 | Curtis | 56—329 |
| 3,080,698 | 4/1963 | Beckman | 56—328 |
| 3,145,521 | 8/1964 | Herbst | 56—328 |

ABRAHAM G. STONE, Primary Examiner.

P. A. RAZZANO, Assistant Examiner.